United States Patent Office 3,700,400
Patented Oct. 24, 1972

3,700,400
SILICONE-POLYALKYLENE OXIDE BLOCK CO-
POLYMER SUPPRESSING FOAM IN JET
DYEING
William Wilson Cuthbertson, Saltcoats, Scotland, assignor
to Imperial Chemical Industries Limited, London, England
No Drawing. Filed May 3, 1971, Ser. No. 139,812
Int. Cl. D06p 1/68
U.S. Cl. 8—83                                                10 Claims

ABSTRACT OF THE DISCLOSURE

Antifoam compositions consisting of silica-containing siloxane/oxyalkylene copolymers which are particularly suitable for jet dyeing.

---

This invention relates to new and improved antifoam compositions and more particularly to such compositions based on organopolysiloxanes.

Antifoam compositions consisting essentially of linear diorganopolysiloxanes such as the dimethylpolysiloxanes have been widely used for defoaming many media and have proved highly acceptable. Many of the compositions used have also had incorporated therein small quantities of a silica. One common application of these compositions is in the process of dyeing where their use ensures a uniform level of dyeing. These compositions have been satisfactory for the conventional dyeing processes. There are now in use, however, dyeing processes which involve the use of higher temperatures and pressure jet-dyeing machines in which the goods are kept in motion by means of a jet of dye liquor which simultaneously dyes them. In these machines extreme turbulence occurs and although the foaming can be controlled, difficulties arise by deposition of a film of silicone in the machinery which thus gives rise to spotting of the goods being dyed. This problem can be overcome to some extent by the use of a composition based on an organopolysiloxane which is soluble in cold water but insoluble in hot water and which thus acts as a defoaming agent in the heat. These organopolysiloxane compositions such as those based on the siloxane/oxyalkylene copolymer have, however, very inferior antifoam activity when compared with the silica filled dimethylpolysiloxanes. We have now found that the antifoam activity of siloxane/oxyalkylene copolymers is increased several fold by the incorporation therein of a proportion of a suitable silica.

According to the present invention a new and improved anti-foam composition comprises a cold water soluble siloxane/oxyalkylene copolymer having incorporated the resin up to 10 percent by weight thereof of a silica of surface area from 50 to 500 m.$^2$/g.

Our invention also resides in a process of jet dyeing wherein the dye bath contains an anti-foam composition which comprises a siloxane/oxyalkylene copolymer having incorporated therein up to 10 percent by weight of a silica of surface area from 50 to 500 m.$^2$/g.

The compositions of our invention preferably consist only of the siloxane/oxyalkylene copolymer and the silica and are normally used in the form of aqueous solution or dispersion thereof.

While the silica may be present in the compositions of our invention in amount up to 10 percent by weight of the siloxane/oxyalkylene copolymer, it is in general preferred that it be present in amount from 0.5 to 5.0 percent by weight thereof.

A wide variety of silicas may be used in our compositions. In general, however, fume silicas and precipitated silicas are preferred. While the silica may be of surface area from 50 to 500 m.$^2$/g. it is normally preferred to use silicas of surface area from 100 to 300 m.$^2$/g.

The siloxane/oxyalkylene copolymers used in our compositions must have at least one polysiloxane block and at least one polyoxyalkylene block comprising at least 2 oxyalkylene units. The proportion of polysiloxane to polyoxyalkylene in the copolymer may vary widely, for example, from 5:95 to 95:5 by weight. It is, however, normally preferred that it be from 10:90 to 60:40.

The polysiloxane blocks may be linear or branched but the degree of branching must be such that the copolymer is a liquid or a low melting solid, i.e, melting at not more than about 50° C. The units in the polysiloxane which are attached to polyoxyalkylene blocks may include such as ($-$SiO$_{3/2}$), ($-$RSiO), ($-$R$_2$SiO$_{1/2}$), ($=$SiO) and ($=$RSiO$_{1/2}$) the free valencies being occupied by polyoxyalkylene blocks. It is in general preferred that there should not be more than one polyoxyalkylene block attached to any one silicon atom.

The remaining units in the polysiloxane blocks are preferably (R$_2$SiO) units and it is also preferred to have (R$_3$SiO$_{1/2}$) terminal units or alternatively ($-$R$_2$SiO$_{1/2}$) units having a polyoxyalkylene block attached thereto. There may also be present minor amounts of (RSiO$_{3/2}$) and (SiO$_2$) units. The groups R are substituted or unsubstituted monovalent hydrocarbon groups or hydrogen and may be, for example, alkyl, aryl, aralkyl, alkaryl, alkenyl, or cycloalkyl groups or such groups substituted, for example, by halogens or cyano groups. Suitable groups R include, for example, methyl, ethyl, propyl, butyl, decyl, phenyl, naphthyl, benzyl, 2-phenylethyl, tolyl, vinyl, allyl, cyclohexyl, chloromethyl, γ-chloropropyl, β-cyanoethyl, γ-cyanopropyl and p-chlorophenyl groups. It is frequently preferred that the groups R, which need not necessarily be all alike, be methyl groups with or without a minor proportion of hydrogen.

The polyoxyalkylene blocks consist of units of the formula (C$_n$H$_{2n}$O) where $n$, which need not be the same in all units, is 2, 3 or 4. The blocks are preferably made up of oxyethylene units either alone or in conjunction with oxy-1, 2-propylene units, there being always a sufficient proportion of oxyethylene units to render the copolymers soluble in cold water. The polyoxyalkylene blocks may be linear or may be branched and joined to silicon at one or both ends either directly through an Si—O—C linkage or through a bridging group which is itself attached to silicon through an Si—C linkage and are preferably of formula (OC$_n$H$_{2n}$)$_y$OR' where $y$ is an integer from 2 to 200 and R' is an alkyl, cycloalkyl, acyl or carbamyl group and preferably a lower alkyl or cycloalkyl group.

When the polyoxyalkylene blocks are attached to a silicon atom by a bridging group this may be an organic group of valency 2, 3 or 4 but is preferably of valency 2. One valency of the group is satisfied by silicon and the remainder by oxygen atoms attached to polyoxyalkylene blocks. Groups suitable for this purpose include, for example, divalent groups containing carbon and hydrogen only, such as 1,3-propylene, 1,11-undecylene.

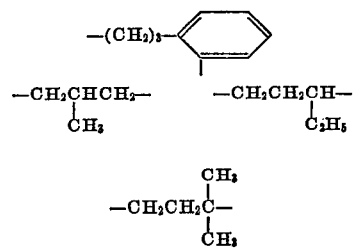

divalent groups containing carbon, hydrogen and oxygen such as:

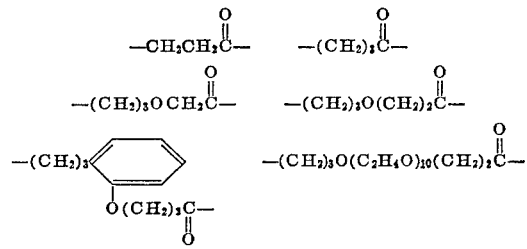

divalent groups containing carbon, hydrogen, oxygen and nitrogen such as

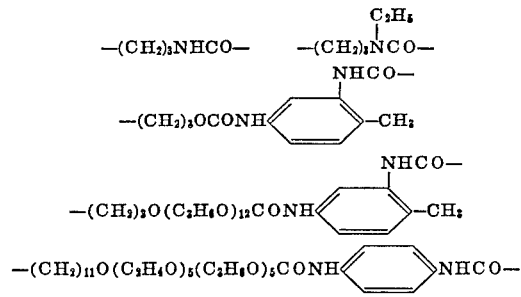

trivalent groups containing carbon and hydrogen such as

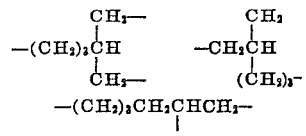

trivalent groups containing carbon, hydrogen and oxygen such as

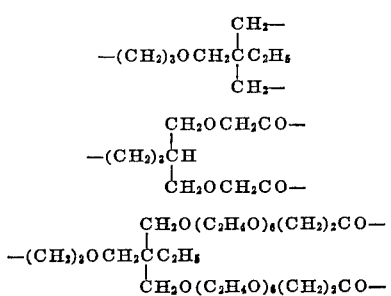

trivalent groups containing carbon, hydrogen, oxygen and nitrogen such as

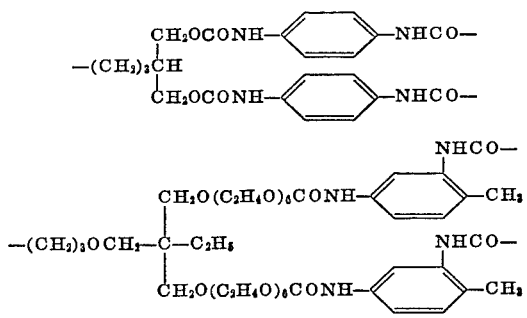

and tetravalent groups such as

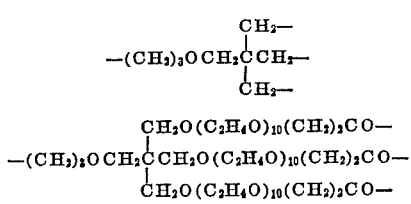

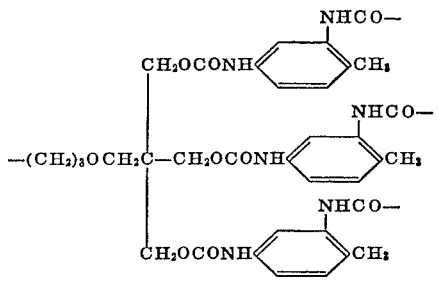

A preferred type of copolymer is of general formula

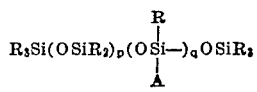

where R is as defined, A is $(OC_nH_{2n})_yOR'$, $p$ is an integer from 0 to 100 and $q$ is an integer from 1 to 50 and a particularly preferred type is where R is a methyl group, $n$ is 2 or 3 and R' is a lower alkyl or cycloalkyl group.

Copolymers of the type described above are disclosed in U.S. Pats. 2,834,748, 2,846,458, 3,168,543, 3,398,104, 3,402,192 and 3,483,240; British Pats. 802,688, 954,041, 994,396, 1,015,611 and 1,257,650 and by R. J. Boudreau, Modern Plastics, vol. 44, page 133 (1967).

Our invention is further illustrated by the following examples in which all parts and percentages are by weight.

EXAMPLE 1

20 parts of a fume silica of surface area 300 m.²/g. were added while stirring to 980 parts of a siloxane/oxyalkylene copolymer heated to 100–120° C. The mixture was heated for 1 hour and then cooled to 20° C.

The activity of the composition was tested by determining the volume of a 10 percent aqueous solution necessary to defoam 2.5 litres of a 0.01 percent aqueous solution of a sodium alkylsulphate, when circulated through an open vessel at a rate of 10 litres per minute at a temperature of 90° C.

For purposes of comparison the activity of a conventional dimethyl silicone and of the siloxane/oxyalkylene copolymer alone were also tested. The results were as follows:

| | Ml. |
|---|---|
| Conventional silicone | 0.05 |
| Siloxane/oxyalkylene copolymer (no silica) | 1.0 |
| Siloxane/oxyalkylene copolymer (with silica) | 0.15 |

The siloxane/oxyalkylene copolymer was of average formula

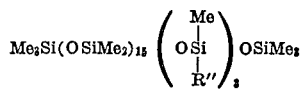

where R" had an average molecular weight of about 1500, was of formula $(OC_nH_{2n})_yOR'''$ containing equal weights of oxyethylene and oxy-1,2-propylene units and R''' was an n-butyl group.

EXAMPLE 2

A composition identical to that of Example 1 except that the silica was of surface area 200 m.²/g. was made and tested in the same manner as in Example 1. The volume required was 0.25 ml.

EXAMPLE 3

A composition identical to that of Example 1 except that the silica was of surface area 460 m.²/g. was made and tested in the same manner as in Example 1. The volume required was 0.15 ml.

EXAMPLE 4

A composition identical to that of Example 1 except that the silica was a diatomaceous earth of surface area 130 m.²/g. was made and tested in the same manner as in Example 1. The volume required was 0.15 ml.

EXAMPLE 5

15 ml. of the aqueous solution of the composition of Example 1 were added to the cold dye liquor in a Gaston County Jet Dyeing Machine of capacity 1200 litres. The temperature of the dye liquor was raised to 125° C. and dyeing carried out for a total of 8 hours with four intermediate additions of dyestuff. During the entire cycle there was no evidence of foam, even when the pressure was built up and released.

After dyeing the goods were subjected to a cold water rinse and finished in the normal manner. Careful examination of the dyed goods revealed no colour unevenness nor any trace of silicone spotting.

The Gaston County Jet Dyeing Machine is disclosed in U.S. Pat. 2,978,291 and involves dyeing in a closed vessel under pressure by circulating the dye liquor or dye bath through a jet together with the goods being dyed.

EXAMPLE 6

30 ml. of the aqueous solution of the composition of Example 1 were added to the cold dye liquor in a Gaston County Jet Dyeing Machine of capacity 2700 litres. Dyeing of an 80/20 "Orlon"/wool blend was then carried out at 105° C. for 3 hours, during which no evidence of foam was observed.

EXAMPLE 7

A composition identical to that of Example 1 except that the siloxane/oxyalkylene copolymer had the following structure

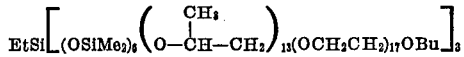

was prepared and tested. The activity found was 10 ml.

EXAMPLE 8

A compoistion identical to that of Example 1 except that the siloxane/oxyalkylene copolymer had the following structure

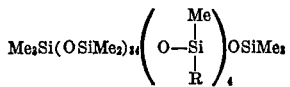

where

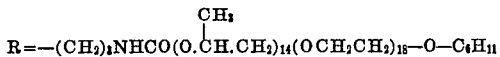

was prepared and tested. The activity found was 0.6 ml.

EXAMPLE 9

A composition identical to that of Example 1 except that the siloxane/oxyalkylene copolymer had the following structure

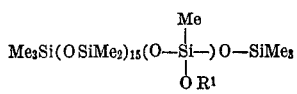

where

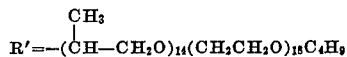

was prepared and tested. The activity found was 0.3 ml.

EXAMPLE 10

A composition identical to that of Example 9 except that the silica used was of surface area 300 m.²/g. was prepared and tested. The activity found was 1 ml.

EXAMPLE 11

A composition identical to that of Example 8 except that the silica used was of surface area 460 m.²/g. was prepared and tested. The activity found was 0.4 ml.

EXAMPLE 12

A composition identical to that of Example 1 except that the siloxane/oxyalkylene copolymer was of the following composition

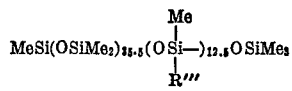

where

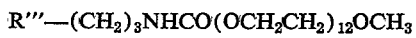

was prepared and tested. The activity found was 25 ml.

EXAMPLE 13

A composition identical to that of Example 12 except that a diatomaceous earth of surface area 130 m.²/g. was used, was prepared and tested. The activity found was 15 ml.

What is claimed is:

1. In a process of jet dyeing wherein the dyebath is circulated by means of a jet, the improvement which comprises using a dyebath which contains an anti-foam composition comprising a cold water soluble siloxane/oxyalkylene copolymer consisting of at least one polysiloxane block and at least one polyoxyalkylene block comprising at least two oxyalkylene units, the polysiloxane blocks having one or more of one or more of the units ($-SiO_{2/2}$), ($-RSiO$), ($-R_2SiO_{1/2}$), ($=SiO$) or ($=RSiO_{1/2}$) having one or more polyoxyalkylene blocks attached thereto and the remaining units in the polysiloxane blocks being ($R_2SiO$) units where R is a substituted or unsubstituted monovalent hydrocarbon group or hydrogen and the polyoxyalkylene blocks consist of units of the formula ($C_nH_{2n}O$) where $n$ is 2, 3 or 4, having incorporated therein up to 10 percent by weight thereof of a silica of surface area from 50 to 500 m.²/g.

2. The process of claim 1 wherein the silica in the anti-foam composition is present in amount from 0.5 to 5.0 percent by weight of the copolymer and is of surface area from 100 to 300 m.²/g.

3. The process of claim 1 wherein the proportion of polysiloxane to polyoxyalkylene in the copolymer is from 5:95 to 95:5 by weight.

4. The process of claim 3 wherein the proportion is from 10:90 to 60:40.

5. The process of claim 1 wherein the groups R are methyl groups.

6. The process of claim 1 wherein the polyoxyalkylene blocks consist of units selected from the group consisting of oxyethylene units alone and oxy-1,2-propylene units.

7. The process of claim 1 wherein the polyoxyalkylene blocks are of the formula $R'O(C_nH_{2n}O)_y$ where R' is an alkyl, cycloalkyl, acyl or carbamyl group, $n$ is 2, 3 or 4 and $y$ is an integer from 2 to 200.

8. The process of claim 7 wherein R' is selected from the group consisting of lower alkyl and cycloalkyl groups.

9. The process of claim 7 wherein the copolymer is of the general formula

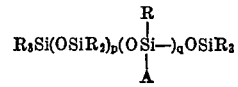

where A is $(OC_nH_{2n})_y$ OR', $p$ is an integer from 0 to 100, $q$ is an integer from 1 to 50, $n$ is 2 or 3 and R' is a lower alkyl or cycloalkyl group.

10. In a process of jet dyeing wherein the dyebath is circulated through a jet, the improvement which comprises using a dyebath which contains an antifoam composition comprising a cold water soluble siloxane/oxyalkylene copolymer consisting of at least one polysiloxane block and at least one polyoxyalkylene block, said copolymer having incorporated therein up to 10 percent by weight thereof of a silica of surface area from 50 to 500 m.$^2$/g.

References Cited

FOREIGN PATENTS 804,369  11/1954  Great Britain _____ 252—321
794,405  5/1958   Great Britain _____ 252—321

DONALD LEVY, Primary Examiner

U.S. Cl. X.R.

8—92, 93, Digest 1